United States Patent
Iwasaki (10) Patent No.: US 7,796,362 B2
(45) Date of Patent: Sep. 14, 2010

(54) MEDIUM HAVING RECORDING LAYER HAVING PATTERN STRUCTURE OF MAGNETIC MATERIAL AND NON MAGNETIC MATERIAL HAVING LARGER YOUNG'S MODULUS

(75) Inventor: Tomio Iwasaki, Tsukuba (JP)

(73) Assignee: Hitachi, Ltd., Tokyo (JP)

( * ) Notice: Subject to any disclaimer, the term of this patent is extended or adjusted under 35 U.S.C. 154(b) by 808 days.

(21) Appl. No.: 11/624,274

(22) Filed: Jan. 18, 2007

(65) Prior Publication Data

US 2007/0206325 A1 Sep. 6, 2007

(30) Foreign Application Priority Data

Mar. 1, 2006 (JP) ............................. 2006-054939

(51) Int. Cl.
*G11B 5/74* (2006.01)
*G11B 5/82* (2006.01)

(52) U.S. Cl. .................. 360/131; 360/133; 360/135

(58) Field of Classification Search ......... 360/131–135; 428/817–848.9
See application file for complete search history.

(56) References Cited

U.S. PATENT DOCUMENTS

| | | | |
|---|---|---|---|
| 5,455,093 A * | 10/1995 | Kawamata et al. | ....... 428/840.6 |
| 6,495,240 B1 | 12/2002 | Wada et al. | |
| 2002/0135939 A1 | 9/2002 | Wada et al. | |
| 2003/0072971 A1 | 4/2003 | Fukutani et al. | |
| 2005/0086795 A1 | 4/2005 | Suwa et al. | |
| 2005/0185561 A1 | 8/2005 | Hattori et al. | |
| 2005/0186356 A1 | 8/2005 | Hattori et al. | |
| 2005/0186357 A1 | 8/2005 | Hattori et al. | |
| 2005/0199581 A1 | 9/2005 | Suwa et al. | |
| 2005/0243467 A1 | 11/2005 | Takai et al. | |
| 2006/0019124 A1 | 1/2006 | Iwasaki et al. | |
| 2006/0199043 A1 * | 9/2006 | Sugimoto et al. | ........ 428/828.1 |

FOREIGN PATENT DOCUMENTS

| | | |
|---|---|---|
| JP | 8-263839 | 10/1996 |
| JP | 2000-298823 | 10/2000 |
| JP | 2005-122876 | 5/2005 |
| JP | 2005-235356 | 9/2005 |

(Continued)

OTHER PUBLICATIONS

Ryougo Kubo et al., Iwamami's Dictionary of Physics and Chemistry, 4th Edition, Iwanami Shoten, Oct. 1987, pp. 764, 1202, 1336 with the English translation of cover page.

(Continued)

*Primary Examiner*—A. J. Heinz
(74) *Attorney, Agent, or Firm*—Antonelli, Terry, Stout & Kraus, LLP.

(57) ABSTRACT

The present invention provides a highly reliable patterned medium without generating an error in recording and reproduction, and a magnetic disc memory device using the same. The patterned medium has a substrate, a soft magnetic layer, a non-magnetic layer, an intermediate layer and a recording layer. The recording layer has a pattern structure of a non-magnetic material and a magnetic material, and the Young's modulus of the non-magnetic material is larger than the Young's modulus of the magnetic material.

8 Claims, 7 Drawing Sheets

FOREIGN PATENT DOCUMENTS

JP 2006-40329 2/2006

OTHER PUBLICATIONS

JP Office Action dated Jun. 2, 2009 of Appln. No. 2006-054939.
Nakatani et al., Molecular Dynamics Study of Mechanical Properties and Inelastic Deformation Mechanism of Nanocrystalline Materials Under Tensile Loading, Collected Papers of Japan Mechanical Engineering Society, vol. 66, No. 643, (Mar. 2000), Paper No. 99-0327, pp. 17-23.

Maruzen Kabushiki-kaisha, Handbook of Chemistry, Fundamentals II by Japan Chemical Society, Sep. 25, 1966, Table 5.67, p. 480.

Japanese Office Action of application No. 2006-054939 dated Oct. 20, 2009 with partial translation.

* cited by examiner

MEDIUM HAVING RECORDING LAYER HAVING PATTERN STRUCTURE OF MAGNETIC MATERIAL AND NON MAGNETIC MATERIAL HAVING LARGER YOUNG'S MODULUS

BACKGROUND OF THE INVENTION

1. Field of the Invention

The present invention relates to a patterned medium preferable for a magnetic disc memory device such as a hard disc device.

2. Description of the Related Art

Recently, the recording capacity of the magnetic discs such as a hard disc device has been dramatically increased. This is owing to the dramatic increase of the areal density of the magnetic disc. As a technique for increasing the areal density of the magnetic disc, a patterned medium with a recording layer formed by a projecting and recessed pattern can be presented.

[Patent Document 1] Japanese Patent Application Laid-Open No. 2005-122876

Although the patterned medium has an advantage of obtaining a high areal density, it is disadvantageous in that an error may be generated in recording and reproduction due to deformation of the projecting portion caused by collision of the lower end of the magnetic head with a projecting portion of the recording layer.

SUMMARY OF THE INVENTION

An object of the present invention is to provide a highly reliable patterned medium without generating an error in recording and reproduction, and a magnetic disc memory device using the same.

According to the present invention, a patterned medium has a substrate, a soft magnetic layer, a non-magnetic layer, an intermediate layer and a recording layer. The recording layer has a pattern structure of a non-magnetic material and a magnetic material, and the Young's modulus of the non-magnetic material is larger than the Young's modulus of the magnetic material.

According to the present invention, a highly reliable patterned medium without generating an error in recording and reproduction can be provided.

DESCRIPTION OF THE PREFERRED EMBODIMENTS

Figure 1:
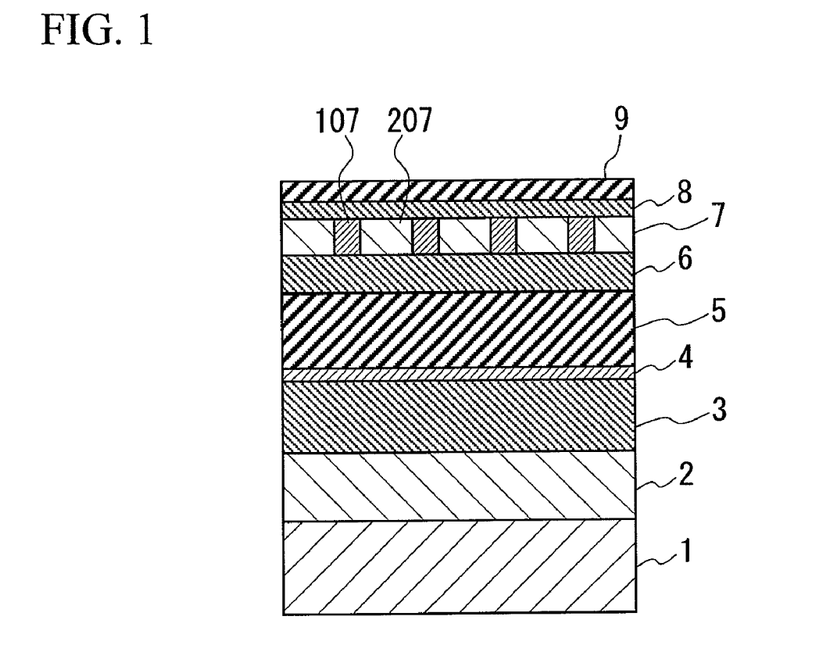
FIG. 1 is a diagram showing the structure of a first embodiment of a patterned medium of the present invention.

FIG. 1 shows a first embodiment of a patterned medium of the present invention. The patterned medium of this embodiment has a substrate 1, a pre-coat layer 2 thereon, a soft magnetic layer 3, a non magnetic layer 4, a soft magnetic layer 5, an intermediate layer 6, a recording layer 7, a protection layer 8 and a lubricant layer 9. The recording layer 7 has a pattern structure of a non-magnetic member 107 and a magnetic member 207. The pre-coat layer 2, the soft magnetic layer 3, the non magnetic layer 4, the soft magnetic layer 5, the intermediate layer 6, and the recording layer 7 are made of a metal, and they are formed by for example a DC magnetron sputtering method. It is preferable that the soft magnetic layers 3, 5 are made of an amorphous material. The intermediate layer 6 includes Ru as the principal constituent element, and it also contains as the additional elements, Ti by a concentration of 0.14 at % or more and 25 at % or less. The principal constituent element denotes the element included by the largest atomic percent concentration.

Figure 2:
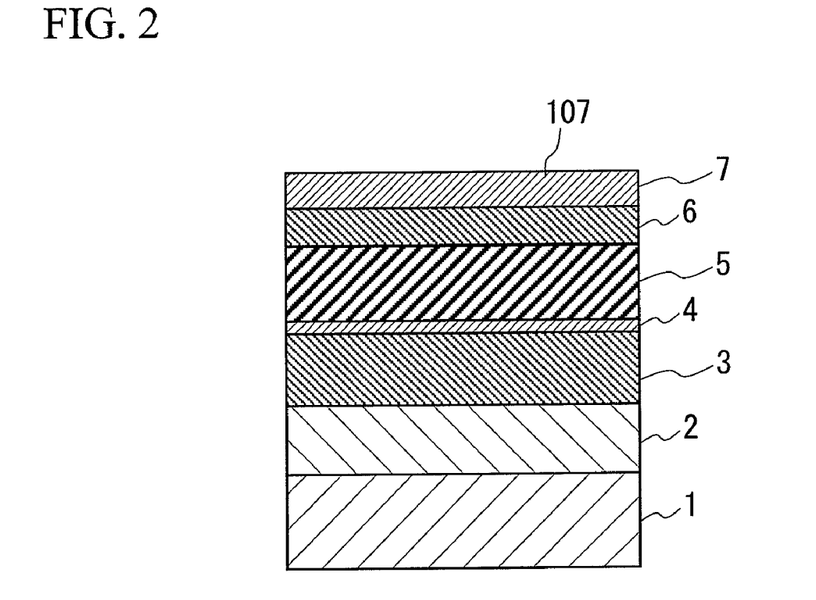
FIG. 2 is a diagram for explaining a process of a first embodiment of a production method for a recording layer of a patterned medium of the present invention.

With reference to FIGS. 2 to 5, the production method for a patterned medium of the present invention, in particular, the method for forming the pattern structure of the recording layer 7 will be explained. First, as shown in FIG. 2, the pre-coat layer 2, the soft magnetic layer 3, the non-magnetic layer 4, the soft magnetic layer 5, and the intermediate layer 6 are formed on the substrate 1, and furthermore, the non magnetic material layer 107 is formed thereon. The non-magnetic material layer 107 may be formed by for example a DC magnetron sputtering method. Since the method for forming the pre-coat layer 2, the soft magnetic layer 3, the non magnetic layer 4, the soft magnetic layer 5, and the intermediate layer 6 on the substrate 1 is already known, explanation thereof will not be described here.

Figure 3:
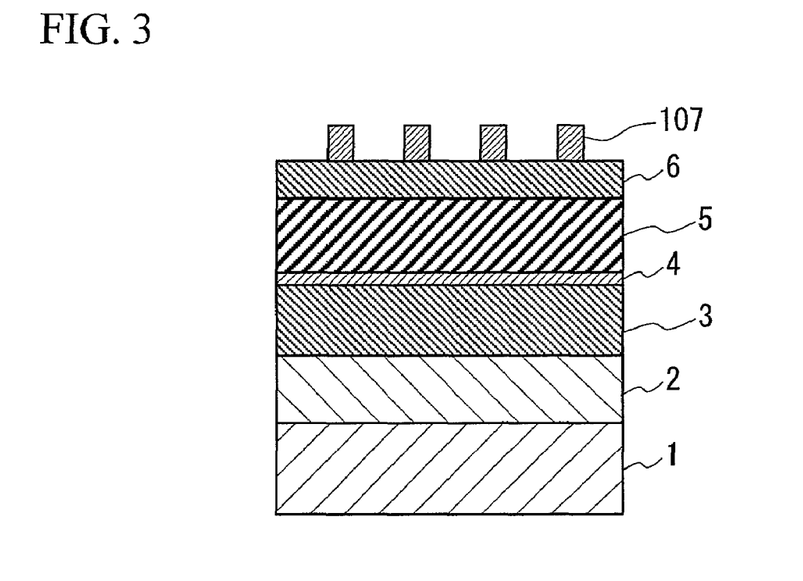
FIG. 3 is a diagram for explaining a process of the first embodiment of a production method for a recording layer of a patterned medium of the present invention.

Next, as shown in FIG. 3, the non-magnetic material layer 107 is patterned. That is, a projecting and recessed pattern of the non-magnetic material layer 107 is formed. Since the thickness of the recessed portion of the non-magnetic material layer 107 is minute, in FIG. 3, only the projecting portion is drawn without showing the recessed portion. The pattern may be formed by for example a nano imprint method. The nano imprint method is a method of patterning the non magnetic material layer 107 by pressing a high temperature mold having a projecting and recessed pattern against the non magnetic material layer 107 and cooling down. Instead of using the nano imprint method, dry etching or wet etching with a mask having a pattern may be utilized as well. Moreover, the pattern may be formed by self organization.

Figure 4:
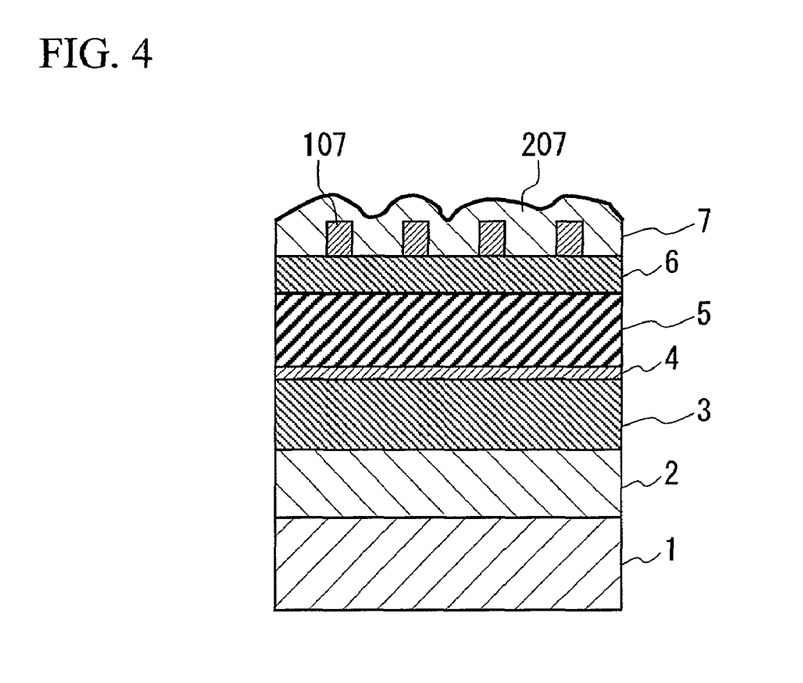
FIG. 4 is a diagram for explaining a process of the first embodiment of a production method for a recording layer of a patterned medium of the present invention.
Figure 5:
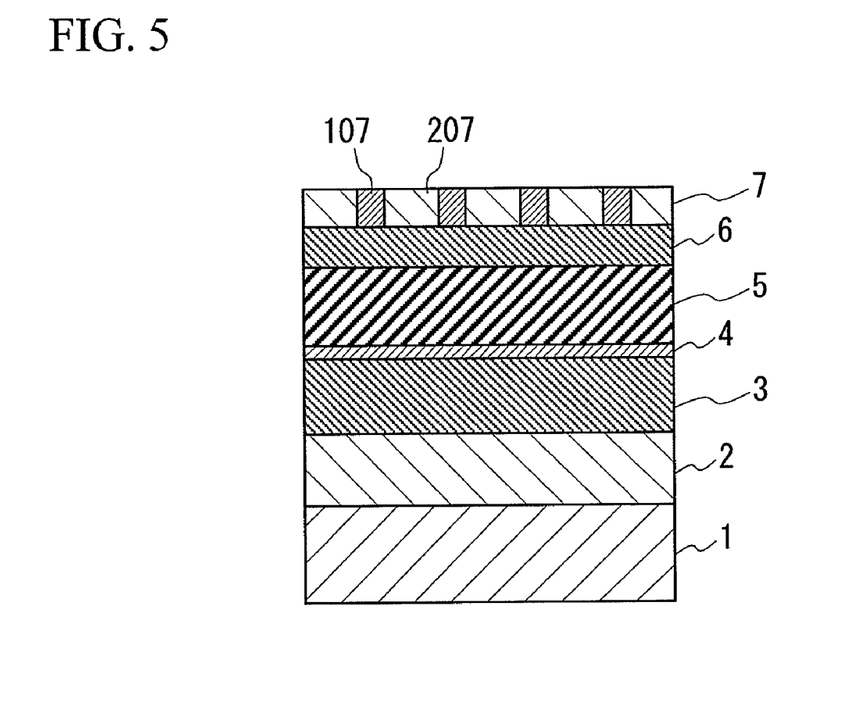
FIG. 5 is a diagram for explaining a process of the first embodiment of a production method for a recording layer of a patterned medium of the present invention.

Next, as shown in FIG. 4, the magnetic material layer 207 is formed so as to fill up the recessed portion of the projecting and recessed pattern of the non-magnetic material layer 107. As shown in the figure, the magnetic material layer 207 may be formed so as to completely fill up the recessed portion of the non-magnetic material layer 107 and furthermore overflow the recessed portion. The magnetic material layer 207 is formed by for example a DC magnetron sputtering method. Next, as shown in FIG. 5, the outer surface of the magnetic material layer 207 is flattened. The flattening operation is carried out by for example a chemical mechanical polishing (CMP). The flattening process may be eliminated. Finally, as shown in FIG. 1, the protection layer 8 and the lubricant layer 9 are formed. Since the method for forming the protection layer 8 and the lubricant layer 9 is already known, explanation thereof will not be described here.

Figure 6:
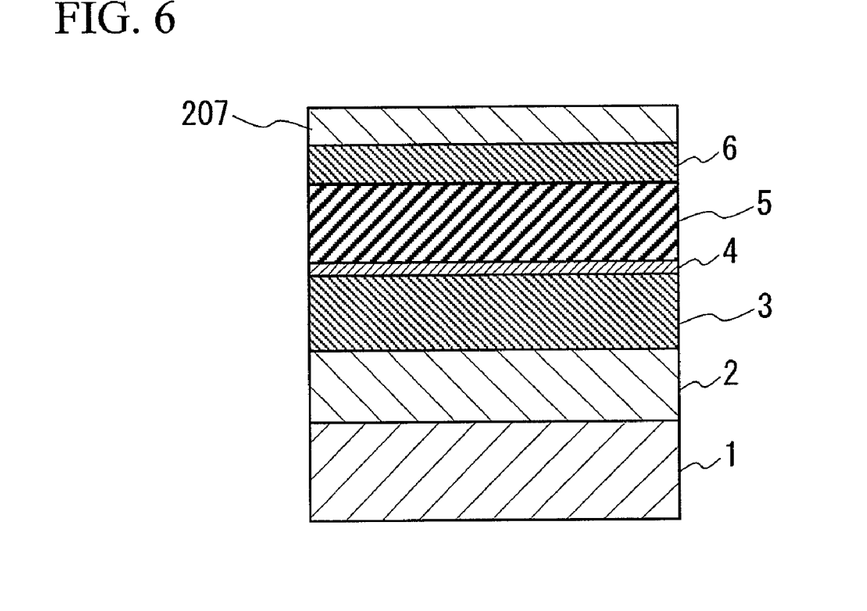
FIG. 6 is a diagram for explaining a process of a second embodiment of a production method for a recording layer of a patterned medium of the present invention.

With reference to FIGS. 6 to 9, another embodiment of the method for forming the pattern structure of the recording layer 7 of a patterned medium of the present invention will be explained. First, as shown in FIG. 6, the pre-coat layer 2, the soft magnetic layer 3, the non-magnetic layer 4, the soft magnetic layer 5, and the intermediate layer 6 are formed on the substrate 1, and furthermore, the magnetic material layer 207 is formed thereon. The magnetic material layer 207 may be formed by for example a DC magnetron sputtering method.

Figure 7:
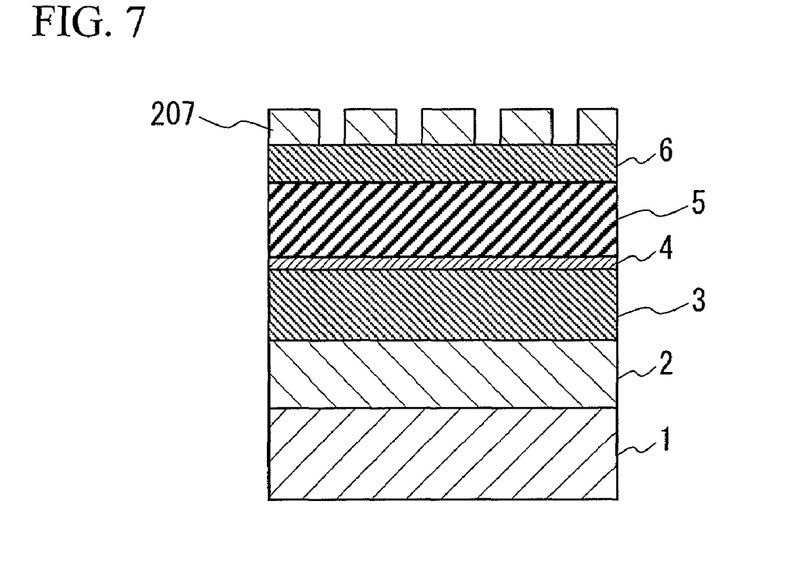
FIG. 7 is a diagram for explaining a process of the second embodiment of a production method for a recording layer of a patterned medium of the present invention.

Next, as shown in FIG. 7, the magnetic material layer 207 is patterned. That is, a projecting and recessed pattern of the magnetic material layer 207 is formed. Since the thickness of the recessed portion of the magnetic material layer 207 is minute, in FIG. 7, only the projecting portion is drawn without showing the recessed portion. The pattern may be formed by for example a nano imprint method.

Figure 8:
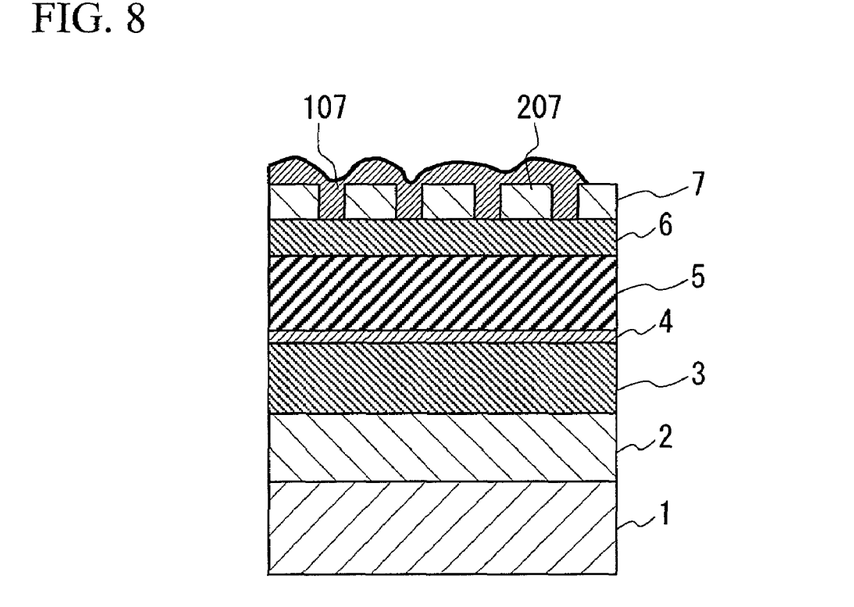
FIG. 8 is a diagram for explaining a process of the second embodiment of a production method for a recording layer of a patterned medium of the present invention.
Figure 9:
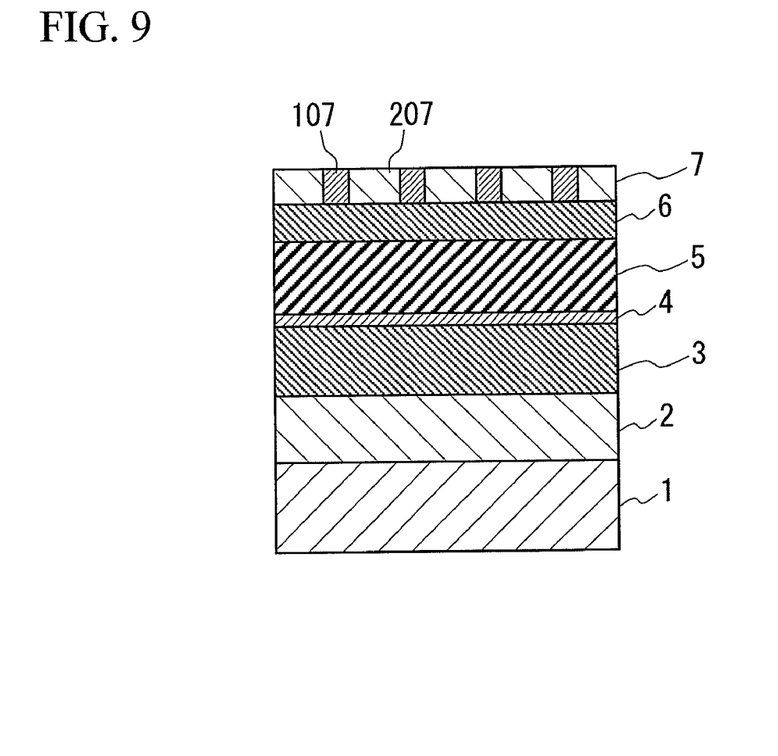
FIG. 9 is a diagram for explaining a process of the second embodiment of a production method for a recording layer of a patterned medium of the present invention.

Next, as shown in FIG. 8, the non-magnetic material layer 107 is formed so as to fill up the recessed portion of the projecting and recessed pattern of the magnetic material layer 207. As shown in the figure, the non-magnetic material layer 107 may be formed so as to completely fill up the recessed portion of the magnetic material layer 207 and furthermore overflow the recessed portion. The non-magnetic material layer 107 is formed by for example a DC magnetron sputtering method. Next, as shown in FIG. 9, the outer surface of the non-magnetic material layer 107 is flattened. The flattening operation is carried out by for example a chemical mechanical polishing (CMP). The flattening process may be eliminated. Finally, as shown in FIG. 1, the protection layer 8 and the lubricant layer 9 are formed. Since the method for forming the protection layer 8 and the lubricant layer 9 is already known, explanation thereof will not be described here.

In making a comparison between the first method for forming a recording layer according to the present invention as explained with reference to FIGS. 2 to 5 and the second method for forming recording layer according to the present invention explained with reference to FIGS. 6 to 9, the magnetic material layer 207 is formed so as to fill up the recessed portion of the projecting and recessed pattern of the non magnetic layer 107 in the first method, whereas the non magnetic material layer 107 is formed so as to fill up the recessed portion of the projecting and recessed pattern of the magnetic material layer 207 in the second method. However, the volume ratio of the non magnetic material layer 107 to the magnetic material layer 207 in the recording layer formed by the second method is equal to the volume ratio of the non magnetic material layer 107 to the magnetic material layer 207 in the recording layer formed by the first method. Therefore, the projecting and recessed pattern of the magnetic material layer 207 used in the second method is in the inverse relationship with the projecting and recessed pattern of the non-magnetic material layer 107 used in the first method.

Figure 10:
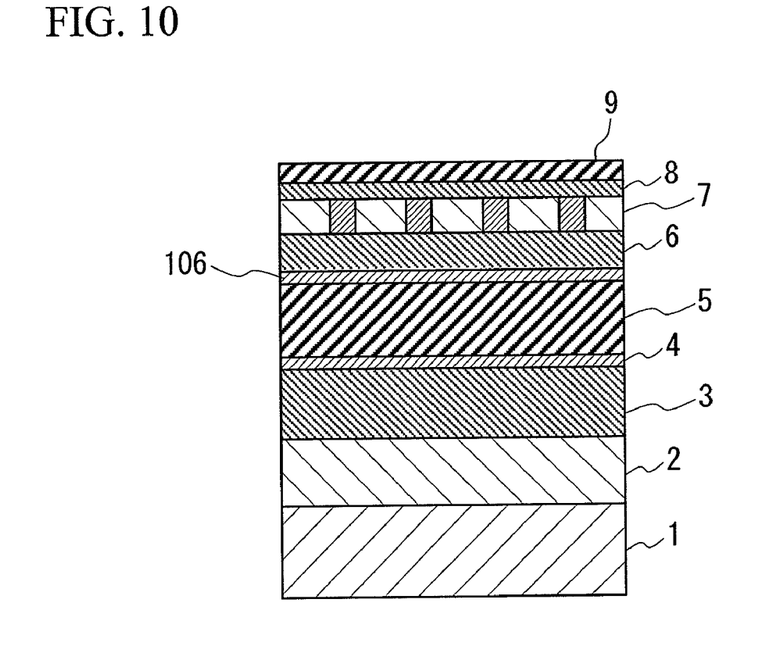
FIG. 10 is a diagram showing the structure of the second embodiment of a patterned medium of the present invention.

FIG. 10 shows a second embodiment of a patterned medium of the present invention. In this embodiment, the base layer 106 is provided between the soft magnetic layer 5 and the intermediate layer 6. The base layer 106 is made of for example a Ti alloy.

Figure 11:
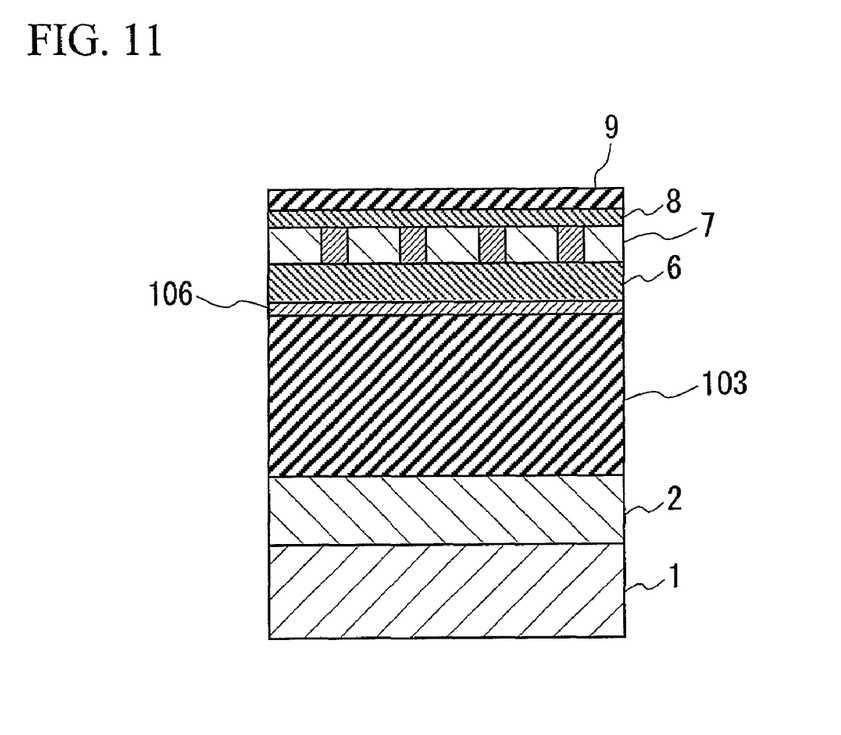
FIG. 11 is a diagram showing the structure of the third embodiment of a patterned medium of the present invention.

FIG. 11 shows a third embodiment of a patterned medium of the present invention. In this embodiment, the soft magnetic layer 103 is provided instead of the soft magnetic layer 3, the non-magnetic layer 4 and the soft magnetic layer 5 in the first and second embodiments. In the patterned media of FIGS. 10 and 11, the pattern structure of the recording layer 7 is formed by the method mentioned above.

The present inventors have found out that deformation of the patterned medium in the surface direction can be restrained when the magnetic head contacts with the patterned medium in the case the Young's modulus of the non magnetic material layer 107 is larger than the Young's modulus of the magnetic material layer 207 in the recording layer 7 of a patterned medium according to the present invention.

Figure 12:
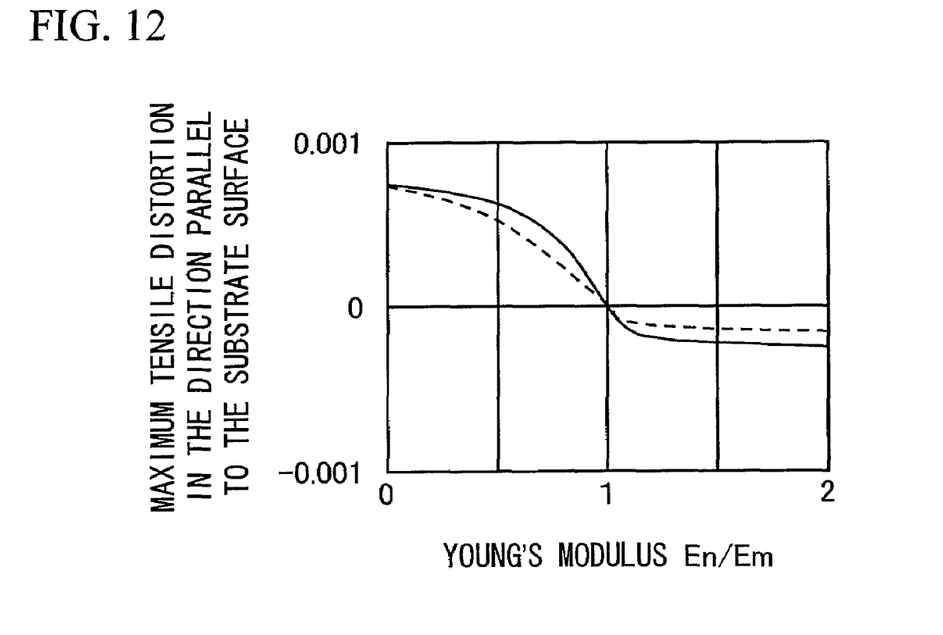
FIG. 12 is a graph showing the result of calculation of the distortion of a patterned medium in the direction parallel to the substrate surface of a recording layer by the molecular kinetic simulation.

FIG. 12 shows the result of calculation of the molecular kinetic simulation carried out by the present inventors. As the magnetic material layer 207, a material containing Co, Cr, and Pt with a 284 GPa Young's modulus was used. The surface distortion of the recording layer was calculated with the Young's modulus of the non-magnetic material layer 107 changed. The distortion in the direction parallel to the substrate surface in the case the magnetic material layer 207 is pressed in the direction perpendicular to the substrate surface and the distortion in the direction perpendicular to the substrate surface was 0.003 was calculated.

The vertical axis denotes the distortion in the direction parallel to the substrate surface, and a positive value is pulling and a negative value is compression. The lateral axis denotes the ratio En/Em of the Young's modulus En of the non-magnetic material layer 107 to the Young's modulus Em of the magnetic material layer 207.

The solid line curve shows the calculation result in the case the volume ratio of the non magnetic material layer 107 to the magnetic material layer 207 in the recording layer 7 is 1, and the broken line curve shows the result in the case the volume ratio of the non magnetic material layer 107 to the magnetic material layer 207 in the recording layer 7 is 0.7. As it is apparent form the comparison between the broken line curve and the solid line curve, the distortion amount is smaller in the case of the 0.7 volume ratio of the non-magnetic material layer 107 to the magnetic material layer 207 than the case of the 1 volume ratio.

The thickness of the magnetic material layer 207 and that of the non-magnetic material layer 107 are substantially same. Therefore, the volume ratio of the non-magnetic material layer 107 to the magnetic material layer 207 is substantially equal to the area ratio of the non-magnetic material layer 107 to the magnetic material layer 207 in the pattern. Therefore, the shape or the design of the pattern may be produced so as to have a 0.7 area ratio of the non-magnetic material layer 107 to the magnetic material layer 207.

It is the tensile distortion in the direction parallel to the substrate surface in the recording layer 7 that influences recording and reproduction of the patterned medium, and the compression distortion in the direction parallel to the substrate surface barely influences recording and reproduction. Therefore, only the tensile distortion in the direction parallel to the substrate surface in the recording layer 7 is discussed here. From FIG. 12, it is learned that tensile distortion is generated in the direction parallel to the substrate surface in the case En/Em<1, with the value increased as the ratio En/Em becomes smaller. In the case En/Em>1, the tensile distortion is not generated in the direction parallel to the substrate surface. That is, the compression distortion in the direction parallel to the substrate surface is generated, and the value is relatively small. Therefore, the Young's modulus En of the non-magnetic material layer 107 needs to be larger than the Young's modulus Em of the magnetic material layer 207.

In the conventional patterned media, as the non-magnetic material layer 107, a silicon oxide layer or an aluminum oxide layer is used. The Young's modulus of the silicon oxide layer is about 70 GPa. The Young's modulus of the aluminum oxide differs between the case of a bulk material and the case of a layer. In the case of a bulk material, it is 200 GPa or more, and in the case of a layer, due to the low atomic number density, it is about 30 GPa to 150 GPa. On the other hand, the Young's modulus of the magnetic material 207 is about 200 GPa or more. Therefore, since En/EM<1, as shown in FIG. 12, tensile distortion is generated in the direction parallel to the substrate surface. This causes an error at the time of reading and writing information.

Therefore, the present inventors have selected the magnetic material layer 207 and the non-magnetic material layer 107 so as to have En/Em>1. As the magnetic material layer 207, a material having Co, Cr and Pt as the constituent elements is selected. The Cr concentration of the magnetic material layer 207 is 15 at % or more and 25 at % or less, and the Pt concentration is 10 at % or more and 20 at % or less. The Young's modulus of the magnetic material layer 207 is about 284 GPa.

It was found out that a material having W or Ta as the main constituent material is preferable as the non-magnetic material layer 107 for such a magnetic material layer 207. As such a constituent material, W, WN, WC, WB, WO, or TaN, TaC, TaB can be presented. The Young's modulus of such a non-magnetic material layer 107 is sufficiently larger than 284 GPa, the Young's modulus of the magnetic material layer 207. Therefore, since En/Em>1, generation of the tensile distortion can be restrained in the direction parallel to the substrate surface.

Figure 13A:
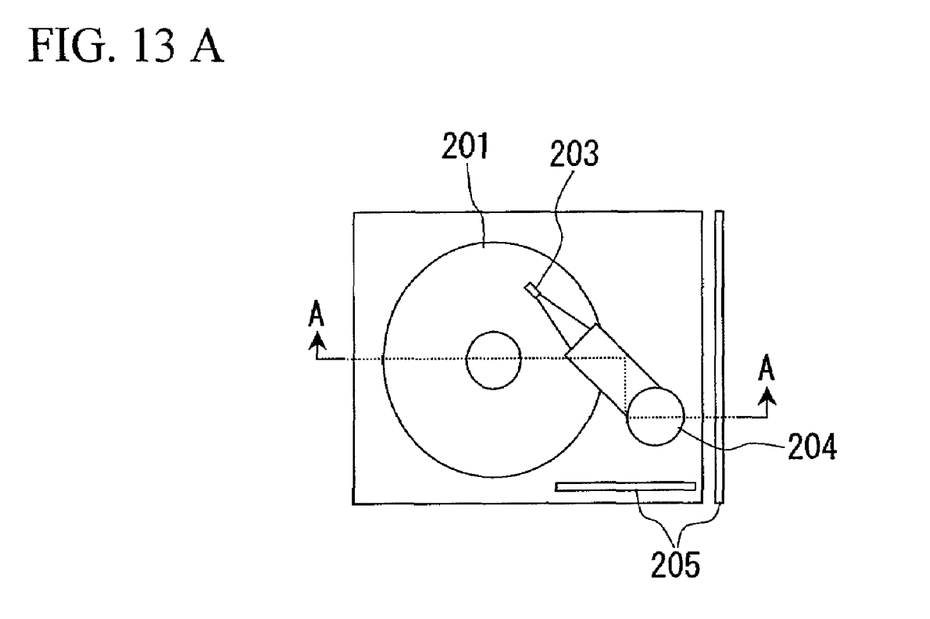
FIG. 13 is a diagram showing the configuration of a hard disc device using a patterned medium of the present invention.
Figure 13B:
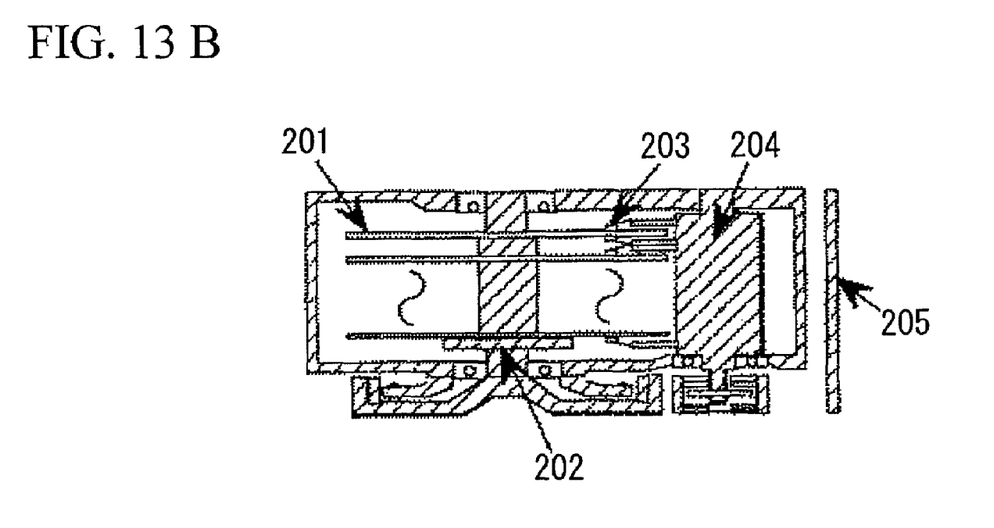

FIG. 13 shows a hard disc device using a patterned medium of the present invention as the recording medium. FIG. 13A shows the planer configuration of the hard disc device, and FIG. 13B shows the cross-sectional configuration along the line A-A of the hard disc device of FIG. 13A. In FIG. 13A, the top surface is eliminated.

The hard disc device of this embodiment has a plurality of patterned media 201, a driving part 202 for rotating the patterned media, a magnetic head 203, a driving means for the magnetic head 204, and a recording and reproduction signal processing means for the magnetic head 205.

The patterned media 201 are the patterned media according to the present invention shown in FIGS. 1, 10 and 11. Even in the case the magnetic head 203 is contacted with the patterned media 201, tensile distortion is restrained in the direction parallel to the substrate surface in the recording layer. Therefore, even in the case the head lift amount (distance between the head and the protection layer) becomes 10 nm or less, reliability of recording and reproduction is high.

Although the embodiments of the present invention have been explained so far, the present invention is not limited to the above-mentioned embodiments, and it is easily understood by those in the art that various modification can be executed within the scope disclosed in the claims.

What is claimed is:

1. A patterned medium comprising a substrate, and a soft magnetic layer, a non magnetic layer, an intermediate layer and a recording layer formed successively on one principal plane side of the substrate, wherein the recording layer has a pattern structure of a non magnetic material containing one of WN, WC, WB and WO as its main constituent material and a magnetic material containing Co, Cr and Pt as its constituent element with the Cr concentration of 15 at % or more and 25 at % or less, and the Pt concentration of 10 at % or more and 20 at % or less, and wherein the Young's modulus of the non magnetic material is larger than the Young's modulus of the magnetic material.

2. The patterned medium according to claim 1, wherein the pattern structure of the recording layer has a structure that a recessed portion of a projecting and recessed pattern of the non magnetic material is filled up with the magnetic material.

3. The patterned medium according to claim 1, wherein the pattern structure of the recording layer has a structure that a recessed portion of a projecting and recessed pattern of the magnetic material is filled up with the non magnetic material.

4. The patterned medium according to claim 1, wherein the soft magnetic layer is made of an amorphous material, and the intermediate layer contains Ru as the main constituent element.

5. The patterned medium according to claim 4, wherein the intermediate layer contains Ti as an additional element.

6. A magnetic disc memory device comprising a patterned medium, a driving part for rotating the patterned medium, a magnetic head for recording and reproduction with respect to the patterned medium, a driving means for driving the magnetic head, and a signal processing means for processing a recording and reproduction signal of the magnetic head, the patterned medium comprising a substrate, and a soft magnetic layer, a non magnetic layer, an intermediate layer and a recording layer formed successively on one principal plane side of the substrate, wherein the recording layer has a pattern structure of a non magnetic material containing one of WN, WC, WB and WO as its main constituent material and a magnetic material containing Co, Cr and Pt as its constituent element with the Cr concentration of 15 at % or more and 25 at % or less, and the Pt concentration of 10 at % or more and 20 at % or less, and wherein the Young's modulus of the non magnetic material is larger than the Young's modulus of the magnetic material.

7. The magnetic disc memory device according to claim 6, wherein the pattern structure of the recording layer has a structure that a recessed portion of a projecting and recessed pattern of the non magnetic material is filled up with the magnetic material.

8. The magnetic disc memory device according to claim 6, wherein the pattern structure of the recording layer has a structure that a recessed portion of a projecting and recessed pattern of the magnetic material is filled up with the non magnetic material.

* * * * *